(12) United States Patent
Chen et al.

(10) Patent No.: US 11,403,404 B2
(45) Date of Patent: Aug. 2, 2022

(54) DATA PROTECTION DEVICE AND DATA PROTECTION METHOD

(71) Applicant: Fulian Precision Electronics (Tianjin) Co., LTD., Tianjin (CN)

(72) Inventors: Yen-Hsuan Chen, New Taipei (TW); Sheng-Chung Pan, New Taipei (TW); Cheng-Da Yang, Neihu (TW); Chien-Sheng Yeh, Neihu (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 633 days.

(21) Appl. No.: 16/437,237

(22) Filed: Jun. 11, 2019

(65) Prior Publication Data
US 2020/0334363 A1    Oct. 22, 2020

(30) Foreign Application Priority Data
Apr. 17, 2019    (CN) .......................... 201910310139.9

(51) Int. Cl.
| G06F 7/04 | (2006.01) |
| G06F 21/57 | (2013.01) |
| H04L 67/00 | (2022.01) |
| G06F 11/32 | (2006.01) |
| G06F 11/34 | (2006.01) |
| G06F 11/30 | (2006.01) |

(52) U.S. Cl.
CPC ........ *G06F 21/577* (2013.01); *G06F 11/3034* (2013.01); *G06F 11/327* (2013.01); *G06F 11/3476* (2013.01); *H04L 67/34* (2013.01)

(58) Field of Classification Search
CPC .................................................. G06F 21/577

USPC ........................................................... 726/27
See application file for complete search history.

(56) References Cited

U.S. PATENT DOCUMENTS

| 7,778,976 B2* | 8/2010 | D'Souza ............... G06F 16/283 707/665 |
| 9,363,149 B1* | 6/2016 | Chauhan ............. H04L 63/1416 |
| 9,430,321 B2* | 8/2016 | Slik ..................... G06F 11/1076 |
| 2013/0067538 A1* | 3/2013 | Dharmarajan ........ H04L 63/102 726/4 |
| 2017/0034258 A1* | 2/2017 | Deulgaonkar ........ G06F 3/0661 |

FOREIGN PATENT DOCUMENTS

| CN | 201374743 Y | * 12/2009 |
| GB | 2515139 A | * 12/2014 ......... G06F 12/0815 |
| TW | 201804354 A | 2/2018 |

* cited by examiner

*Primary Examiner* — Evral E Bodden
(74) *Attorney, Agent, or Firm* — ScienBiziP, P.C.

(57) ABSTRACT

A data protection method implemented in a data protection device includes loading a data protection system in the data protection device, installing an application programming interface of the data protection system in the number of electronic devices, controlling the application programming interface to run in the background of the number of electronic devices, controlling the application programming interface running in each electronic device to monitor a storage device of the electronic device to determine whether data is transferred to the storage device, and outputting a prompt message when it is determined that data has been transferred to the storage of one of the electronic devices. The data protection device is communicatively coupled to the number of electronic devices.

10 Claims, 2 Drawing Sheets

DATA PROTECTION DEVICE AND DATA PROTECTION METHOD

FIELD

The subject matter herein generally relates to data protection, and more particularly to a data protection device and a data protection method.

BACKGROUND

Generally, enterprises set up firewalls to prevent external access to confidential data. However, internal monitoring of data transfer to the outside is lacking.

BRIEF DESCRIPTION OF THE DRAWINGS

Implementations of the present disclosure will now be described, by way of embodiments, with reference to the attached figures.

DETAILED DESCRIPTION

Figure 1:
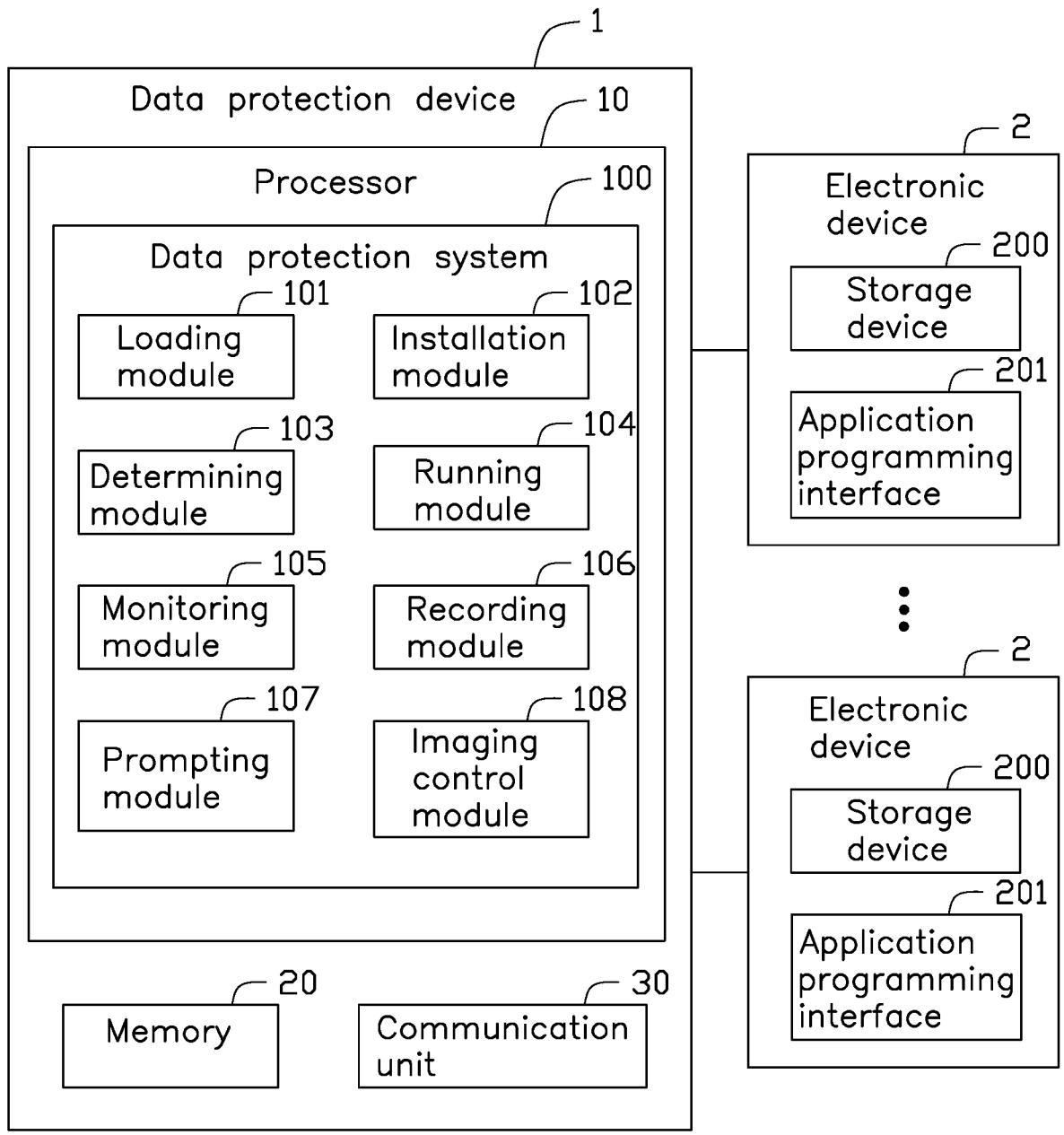
FIG. 1 is a block diagram of an embodiment of a data protection device communicatively coupled to a plurality of electronic devices.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of a data protection device 1. The data protection device 1 is communicatively coupled to a plurality of electronic devices 2 for detecting a data transfer in each of the electronic devices 2, and prompting a manager when there is a data transfer in one or more electronic devices 2 to prevent important data from being leaked. In one embodiment, the data protection device 1 is a server for monitoring functions, and each electronic device 2 can be a file server, a workstation, or a thin client.

The data protection device 1 includes, but is not limited to, a processor 10, a memory 20, and a communication unit 30. The processor 10 may be a single chip microcomputer or a system on chip (SOC). The memory 20 may be is a read-only memory or a random access memory. The communication unit 30 may be a routing device for communicating with the plurality of electronic devices 2 through a wired or a wireless connection. The electronic device 2 includes a storage device 200. The storage device 200 may be an external storage device externally coupled to the electronic device 2, such as a USB flash drive, a mobile hard disk, a mobile floppy disk, or the like.

The data protection device 1 executes a data protection system 100, which includes a plurality of modules. The plurality of modules include a loading module 101, an installation module 102, a determining module 103, a running module 104, a monitoring module 105, a recording module 106, a prompting module 107, and an imaging control module 108. The above modules are programmable software instructions stored in the memory 20 and executable by the processor 10. It can be understood that in other embodiments, the above modules may also be program instructions or firmware embedded in the processor 10.

The loading module 101 is configured to load the data protection system 100 in the data protection device 1.

In one embodiment, the data protection system 100 is a monitoring program, and the loading module 101 controls the data protection system 100 to be executed in response to a user operation installing the data protection system 100 in the data protection device 1.

The installation module 102 is configured to install an application programming interface 201 of the data protection system 100 in the plurality of electronic devices 2.

In one embodiment, the installation module 102 transmits a programming interface file of the data protection system 100 to the plurality of electronic devices 2 through the communication unit 30. When the electronic device 2 receives the application programming interface file, the application programming interface 201 of the data protection system 100 can be automatically installed. The application programming interface 201 is used by the data protection system 100 to monitor the electronic device 2.

In other embodiments, when the electronic device 2 receives the application programming interface file, a user can manually install the application programming interface 201 of the data protection system 100.

In one embodiment, an application scenario includes a plurality of data protection devices 1 each communicatively coupled to a plurality of electronic devices 2, and the loading module 101 loads the data protection system 100 into each data protection device 1. The determining module 103 determines whether each data protection device 1 detects the data protection system 100. The installation module 102, when the determining module 103 determines that each data protection device 1 detects the data protection system 100, installs the application programming interface 201 in each electronic device 2. When the determining module 103 determines that the data protection system 1 is not detected by one or more data protection devices 1, that is, the data protection system 100 is not installed, a prompt message is output to notify an administrator of the data protection device 1 that is not loaded with the data protection system 100.

The running module 104 is configured to control the application programming interface 201 to run in the background of each electronic device 2.

In one embodiment, when the data protection device 1 needs to monitor the plurality of electronic devices 2, the running module 104 sends a control command to the data protection system 100, and the data protection system 100 responds to the control command by controlling the application programming interface 201 to run in the background of each electronic device 2.

The monitoring module 105 is configured to monitor the application programming interface 201 in each electronic device 2 to monitor the storage device 200 to determine whether data is transferred to the storage device 200.

In one embodiment, when the application programming interface 201 is running in the background of each electronic device 2, the monitoring module 105 sends a monitoring command to the data protection system 100, and the data protection system 100 responds to the monitoring command by controlling each electronic device 2 to monitor stored data in the storage device 200 in real time, and further determines whether data is transferred to the storage device 200. In one embodiment, data transfer refers to data copying and data cutting.

The recording module 106 is configured to record related information of the data transfer when the monitoring module 105 determines that the electronic device 2 has data transferred to the storage device 200.

In one embodiment, the related information includes location information of the electronic device 2, a screenshot at a time of the data transfer, and a system log of the electronic device 2. Specifically, the recording module 106 can identify the location information of the electronic device 2 according to an IP address of the electronic device 2. When data in the electronic device 2 is transferred to the storage device 200, the application programming interface 201 automatically controls the electronic device 2 to take a screenshot when the data is transferred. The system log of the electronic device 2 is automatically acquired by the application programming interface 201.

The prompting module 107 is configured to output a prompt message to notify the administrator when the monitoring module 105 determines that the electronic device 2 has data transferred to the storage device 200.

In one embodiment, when the monitoring module 105 determines that the electronic device 2 has data transferred to the storage device 200, the prompting module 107 sends a prompt email to the administrator's email address to notify the administrator. Contents of the prompt email include the related information of the data transfer, that is, the location information of the electronic device 2, the screenshot of the data transfer, and the system log of the electronic device 2. The related information is sent to the administrator's email address.

In other embodiments, the determining module 103 further determines whether the electronic device 2 is in a networked state when the monitoring module 105 determines that the electronic device 2 has data transferred to the storage device 200. The recording module 106 is further configured to record the location information of the electronic device 2, the screenshot when the data is transferred, and the system log of the electronic device 2 when the electronic device 2 is in the networked state. When the electronic device 2 is not in the networked state, the recording module 106 records the screenshot when the data is transferred and the system log of the electronic device 2.

Further, when the monitoring module 105 determines that the electronic device 2 has data transferred to the storage device 200, the determining module 103 determines whether the electronic device 2 is equipped with a camera. When the determining module 103 determines that the electronic device 2 is equipped with a camera, the imaging control module 108 is configured to control the camera to capture an image. The recording module 106 further stores the image captured by the camera to the memory 20. In one embodiment, when the camera captures an image, the image shows a current user of the electronic device 2, and the electronic device 2 transmits the captured image to the data protection device 1. The recording module 106 stores the captured image to the memory 20, so that the administrator can identify the user shown in the stored image.

Figure 2:
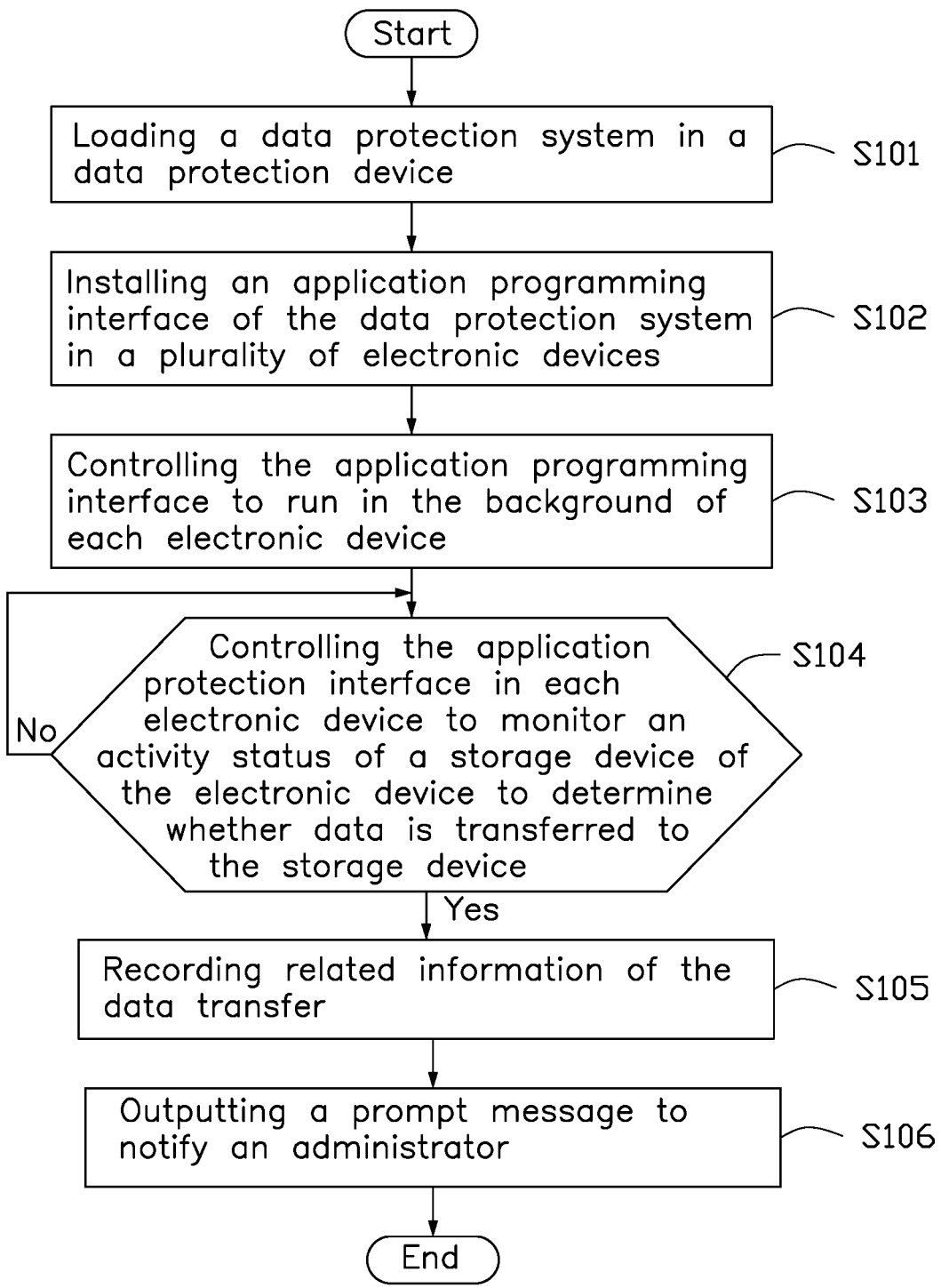
FIG. 2 is a flowchart of a data protection method.

FIG. 2 shows a flowchart of a data protection method. The method is provided by way of embodiment, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S101, a data protection system 100 is loaded in a data protection device 1.

At block S102, an application programming interface of the data protection system 100 is installed in a plurality of electronic devices 2.

In another embodiment, an application scenario includes a plurality of data protection devices 1 each communicatively coupled to a plurality of electronic devices 2, and the data protection system 100 is loaded into each data protection device 1. The data protection system 100 determines whether each data protection device 1 detects the data protection system 100. When the data protection system 100 determines that each data protection device 1 detects the data protection system 100, the application programming interface is installed in each electronic device 2.

At block S103, the application programming interface is controlled by the data protection system 100 to run in the background of each electronic device 2.

At block S104, the application protection interface in each electronic device 2 is controlled by the data protection system 100 to monitor an activity status of a storage device 200 of the electronic device 2 to determine whether data is transferred to the storage device 200. When a determination result is affirmative, block S105 is implemented. When a determination result is negative, block S104 is repeated.

At block S105, related information of the data transfer is recorded.

In this embodiment, the related information includes location information of the electronic device 2, a screenshot at the time of data transfer, and a system log of the electronic device 2.

At block S106, a prompt message is output to notify an administrator.

In one embodiment, block S106 includes sending a prompt email to the administrator's email address to notify the administrator. Contents of the prompt email include the related information of the data transfer, that is, the location information of the electronic device 2, the screenshot of the data transfer, and the system log of the electronic device 2. The related information is sent to the administrator's email address.

Further, whether the electronic device 2 is in a networked state when the electronic device 2 has data transferred to the storage device 200 is determined. The location information of the electronic device 2, the screenshot when the data is transferred, and the system log of the electronic device 2 are recorded when the electronic device 2 is in the networked state. When the electronic device 2 is not in the networked state, the screenshot when the data is transferred and the system log of the electronic device 2 are recorded.

Further, whether the electronic device 2 is equipped with a camera is determined when data is transferred to the storage device 200. When it is determined that the electronic device 2 is equipped with a camera, the data protection system 100 controls the camera to capture an image. The captured image is stored to the memory 20.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A data protection device communicatively coupled to a plurality of electronic devices, the data protection device comprising:
   a processor; and
   a memory storing a plurality of instructions, which are executed by the processor and cause the processor to:
   load a data protection system in the data protection device;
   install an application programming interface of the data protection system in the plurality of electronic devices;
   control the application programming interface to run in the background of the plurality of electronic devices;
   control the application programming interface running in each of the electronic devices to monitor a storage device of the electronic device to determine whether data is transferred to the storage device;
   output a prompt message when data is transferred to the storage device of one of the electronic devices;
   determine whether the electronic device is in a networked state when data is transferred to the storage device of the electronic device;
   record the location information of the electronic device, the screenshot when the data is transferred, and the system log of the electronic device when the electronic device is in the networked state; and
   record the screenshot when the data is transferred and the system log of the electronic device when the electronic device is not in the networked state.

2. The data protection device of claim 1, wherein the processor is further caused to:
   determine whether the data protection system is detected in the data protection device;
   install the application programming interface in each of the plurality of electronic devices when the data protection system is detected in the data protection device.

3. The data protection device of claim 1, wherein the processor is further caused to:
   record related information of a data transfer when data is transferred to the storage device of the electronic device; and
   the prompt message comprises the related information.

4. The data protection device of claim 3, wherein:
   the related information comprises location information of the electronic device, a screenshot at a time of the data transfer, and a system log of the electronic device.

5. The data protection device of claim 4, wherein the processor is further caused to:
   determine, when data has been transferred to the storage device of the electronic device, whether the electronic device is equipped with a camera;
   control the camera to capture an image if the electronic device is equipped with a camera;
   transmit the captured image to the data protection device; and
   store the captured image to the memory.

6. A data protection method implemented in a data protection device communicatively coupled to a plurality of electronic devices, the data protection method comprising:
   loading a data protection system in the data protection device;
   installing an application programming interface of the data protection system in the plurality of electronic devices;
   controlling the application programming interface to run in the background of the plurality of electronic devices;
   controlling the application programming interface running in each of the electronic devices to monitor a storage device of the electronic device to determine whether data is transferred to the storage device;
   outputting a prompt message when data has been transferred to the storage of one of the electronic devices;
   determining whether the electronic device is in a networked state when data is transferred to the storage device of the electronic device;
   recording the location information of the electronic device, the screenshot when the data is transferred, and the system log of the electronic device when the electronic device is in the networked state;
   recording the screenshot when the data is transferred and the system log of the electronic device when the electronic device is not in the networked state.

7. The data protection method of claim 6, further comprising:
   determining whether the data protection system is detected in the data protection device;
   installing the application programming interface in each of the plurality of electronic devices when the data protection system is detected in the data protection device.

8. The data protection method of claim 7, further comprising:
   recording related information of a data transfer when data is transferred to the storage device of the electronic device, and the prompt message comprising the related information.

9. The data protection method of claim 8, wherein:
   the related information comprises location information of the electronic device, a screenshot at a time of the data transfer, and a system log of the electronic device.

10. The data protection method of claim 9, further comprising:

determining, when data is transferred to the storage device of the electronic device, whether the electronic device is equipped with a camera;
controlling the camera to capture an image if the electronic device is equipped with a camera;
transmitting the captured image to the data protection device; and
storing the captured image to the memory.

* * * * *